(12) United States Patent
Hashimoto

(10) Patent No.: US 7,598,978 B2
(45) Date of Patent: Oct. 6, 2009

(54) IMAGING APPARATUS

(75) Inventor: Yoshitaka Hashimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 11/735,190

(22) Filed: Apr. 13, 2007

(65) Prior Publication Data
US 2008/0107444 A1 May 8, 2008

(30) Foreign Application Priority Data
Apr. 14, 2006 (JP) .............................. 2006-112643

(51) Int. Cl.
*H04N 5/225* (2006.01)
(52) U.S. Cl. .................. 348/207.99; 348/374
(58) Field of Classification Search ............ 348/207.99, 348/335, 340, 373, 374; 15/38, 77, 97.1, 15/214, 220.4, 250.19, 257.1, DIG. 14; 359/507
See application file for complete search history.

(56) References Cited

U.S. PATENT DOCUMENTS 7,057,642 B2 * 6/2006 Mogamiya et al. ..... 348/207.99

7,324,148 B2 * 1/2008 Takizawa et al. ............ 348/340
2007/0188649 A1 * 8/2007 Hagihara et al. ............ 348/335

FOREIGN PATENT DOCUMENTS

| JP | 06-063183 | | 3/1994 |
| JP | 6-303471 | * | 10/1994 |
| JP | 2003-5254 | | 1/2003 |
| JP | 2003-18440 | * | 1/2003 |
| JP | 2004-172961 | | 6/2004 |

* cited by examiner

*Primary Examiner*—Lin Ye
*Assistant Examiner*—Chriss S Yoder, III
(74) *Attorney, Agent, or Firm*—Canon USA Inc IP Div

(57) ABSTRACT

An imaging apparatus configured to clean a surface of an optical member disposed in the vicinity of an image sensor that photoelectrically converts an object image. The imaging apparatus includes a foreign substance removal mechanism including a capturing portion configured to capture foreign substances by traveling while contacting a surface of the optical member, and a cleaning mechanism including a wiping portion configured to wipe off the captured foreign substance from the capturing portion to clean the capturing portion.

7 Claims, 12 Drawing Sheets

US 7,598,978 B2

IMAGING APPARATUS

BACKGROUND OF THE INVENTION

1. Field of the Invention

The present invention relates to an imaging apparatus including a device that is configured to remove foreign substance adhering to a surface of an optical member.

2. Description of the Related Art

When a foreign substance such as dust exists in the vicinity of a focal plane of a photographing lens of a camera, a shadow of such foreign substance may undesirably be imaged by a solid-state image sensor. Such foreign substance may exist, for example, due to external entry of dust at the time of changing of lenses, or due to generation of fine abrasion powder of a constituent resin member of a shutter or a mirror, which occurs when the shutter or the mirror operates inside the camera.

Dust generated due to such causes may enter a space between a cover glass, which protects a solid-state image sensor, and an optical filter, such as an infrared-ray cut filter or an optical low-pass filter (LPF), disposed in front of the cover glass. In such a case, it may be necessary to disassemble the camera so as to remove the dust. Accordingly, it is extremely useful to hermetically seal a space between the cover glass and the optical filter for the solid-state image sensor so that dusts cannot enter the space.

However, when dust adheres to a side of the optical filter not opposing the solid-state image sensor, in the vicinity of a focal plane, a shadow of such dust may still be imaged by the solid-state image sensor.

Japanese Utility Model Application Laid-Open No. 06-063183 discusses a method for removing dust adhering to an object to be cleaned using an adhesive cleaning swab. In the method discussed in Japanese Patent Application Laid-Open No. 06-063183, the adhesive cleaning swab includes an adhesive member disposed at one end of a bar-like member via a cushion member and thus has a sufficient cushioning property and adhesive property. The adhesive cleaning swab is used to remove dust adhering to the surface of a cover glass or an optical filter for a solid-state image sensor.

Japanese Patent Application Laid-Open No. 2003-5254 discusses a method for cleaning a surface of a cover glass for a solid-state image sensor or an outermost surface of a hermetically-sealed structure with a wiper disposed on a shutter. With such a camera configuration, dust adhering to a surface of a cover glass for a solid-state image sensor or an outermost surface of a hermetically-sealed structure (e.g., a surface of an optical filter) can be removed without removing a lens or disassembling a camera. Japanese Patent Application Laid-Open No. 2004-172961 discusses a method for removing adhering dust by sliding an adsorbent cleaning film on the surface of a solid-state image sensor. With such a camera configuration, dust adhering to a surface of a cover glass for a solid-state image sensor or an outermost surface of a hermetically-sealed structure (e.g., a surface of an optical filter) can be removed without removing a lens or disassembling a camera. Japanese Patent Application Laid-Open No. 2004-172961 also discusses a method for cleaning the cleaning film using a brush.

In the method discussed in Japanese Utility Model Application Laid-Open No. 06-063183, dust can be readily removed from a surface of a cover glass surface or a surface of an optical filter for a solid-state image sensor if the amount of adhering dust is small. However, if the amount of adhering dust is large, it may be necessary to perform the dust-removing operation a number of times. In addition, if the adhesive cleaning swab contacts a portion other than the object to be cleaned inside a camera, inside portions of the camera may be contaminated. In addition, the adhesive cleaning swab may be inadvertently inserted into high-precision mechanical parts inside the camera.

Furthermore, in the method discussed in Japanese Patent Application Laid-Open No. 2003-5254, the same portion of a surface of a cover glass for a solid-state image sensor or an outermost surface of a hermetically-sealed structure is subjected to friction operations repeatedly in a state in which dust keeps adhering to the wiper. Accordingly, the cover glass surface or the outermost surface may be damaged. Moreover, dust adhering to the wiper may adhere again to the cover glass surface or the outermost surface.

In the method discussed in Japanese Patent Application Laid-Open No. 2004-172961, it is necessary for the size of a camera to be large because a space for winding the cleaning film is required. In addition, if the brush is merely disposed in the vicinity of the surface of a solid-state image sensor to be cleaned, dust that has once been removed from the solid-state image sensor with the brush may adhere again to the solid-state image sensor surface.

SUMMARY OF THE INVENTION

The present invention is directed to an imaging apparatus that readily and appropriately removes foreign substances adhering to a surface to be cleaned in an imaging unit without damaging a camera. Further, the present invention is directed to an imaging apparatus capable of preventing removed foreign substances from adhering again to an imaging unit, without damaging a surface to be cleaned in an imaging unit.

According to an aspect of the present invention, an imaging apparatus includes an image sensor configured to photoelectrically convert an object image, an optical member disposed in the vicinity of the image sensor, a foreign substance removal mechanism including a capturing portion configured to capture foreign substances by traveling while contacting a surface of the optical member, and a cleaning mechanism including a wiping portion configured to wipe off the captured foreign substance from the capturing portion to clean the capturing portion.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
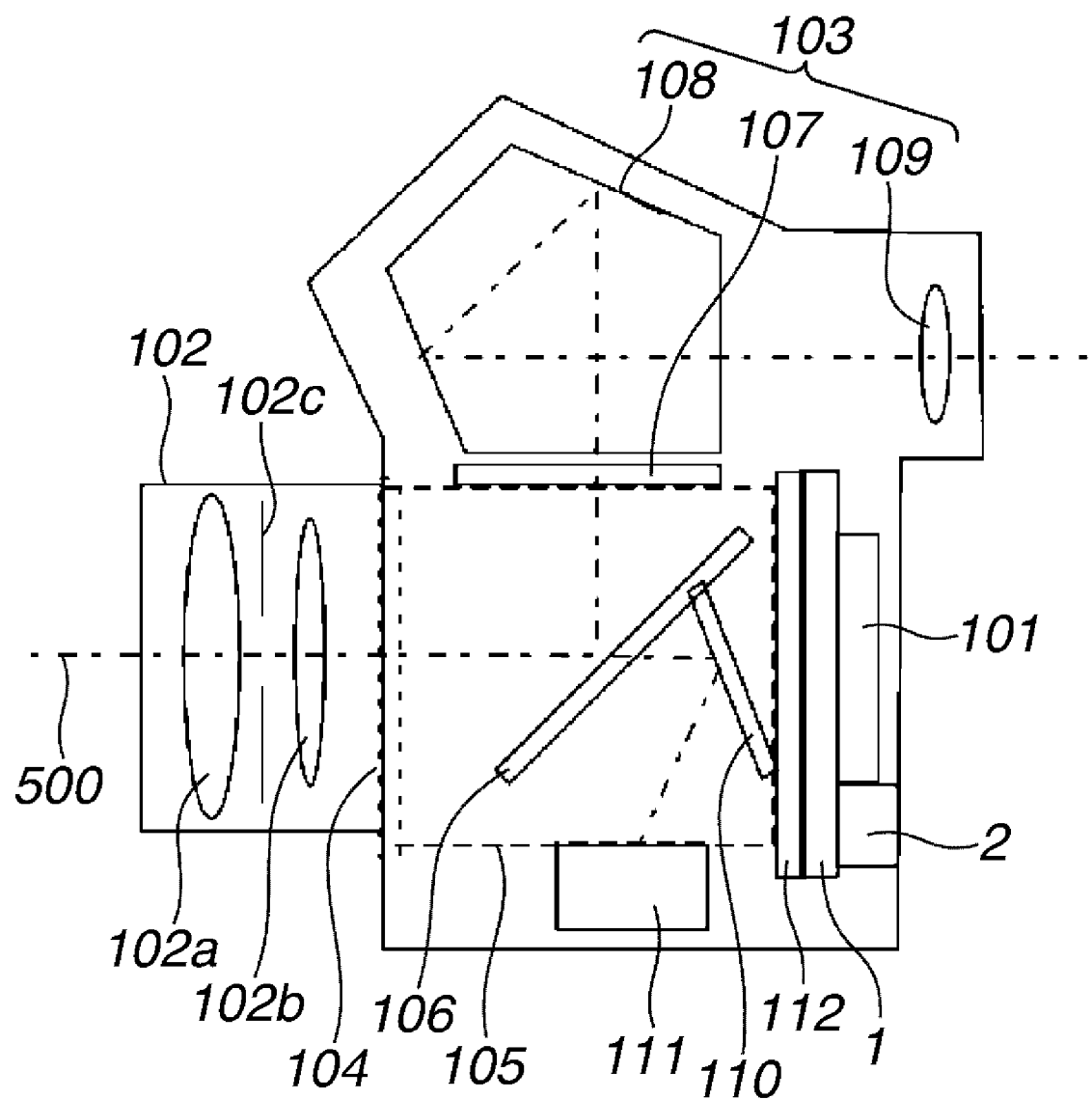
FIG. 1 illustrates an exemplary configuration of an imaging apparatus including a foreign substance removal mechanism and a cleaning mechanism according to a first exemplary embodiment of the present invention.

FIG. 1 illustrates an exemplary configuration of an imaging apparatus including a foreign substance removal mechanism 1 and a cleaning mechanism 2 according to a first exemplary embodiment of the present invention. Referring to FIG. 1, an imaging unit 101 is configured to convert energy of incident light into an electrical signal. The imaging unit 101 includes, mainly, a solid-state image sensor, a cover glass adapted to protect the solid-state image sensor, and an optical filter disposed in front of the cover glass. An interchangeable lens 102 includes a plurality of lens elements 102a and 102b, which are adapted to receive light reflected from an object to form an image on the imaging unit 101, and an aperture stop 102c. Amounting portion 104 is used to mount the interchangeable lens 102 onto the imaging apparatus.

A main mirror 106 can be set to two states, i.e., a state in which the main mirror 106 reflects a part of incident light flux towards a finder 103 and transmits the other part of incident light flux to the imaging unit 101, and a state in which the main mirror 106 retreats from a light path to allow the entire light flux to enter the imaging unit 101. More specifically, the main mirror 106 is configured to rotate inside a mirror box 105 to the two different states described above. An auto focusing (AF) unit 111 is configured to measure a distance to an object. A sub mirror 110 guides a light flux that passes through the main mirror 106, of the incident light flux, to the AF unit 111. A focal plane shutter 112 includes a plurality of shutter blades configured to allow an incident light flux to enter the imaging unit 101 for a desired period of time. The finder 103 includes a focusing screen 107, a prism 108, and an eyepiece 109. The focusing screen 107 allows alight flux reflected upward by the mirror box 105 to be imaged thereon. The prism 108 reflects an image therein to allow an image formed on the focusing screen 107 to become an erecting real image. The eyepiece 109 enables a user to observe an image exiting from the prism 108 at an appropriate magnification rate.

The foreign substance removal mechanism 1 is configured to remove foreign substances adhering to the imaging unit 101. The foreign substance removal mechanism 1 is disposed between the imaging unit 101 and the focal plane shutter 112. The cleaning mechanism 2 is disposed below the imaging unit 101, as illustrated in FIG. 1. In addition, the imaging apparatus includes a mode selection switch (not shown), which is used for switching between a photographing mode and a cleaning mode, and a foreign substance removal mechanism operation button (not shown).

Figure 2:
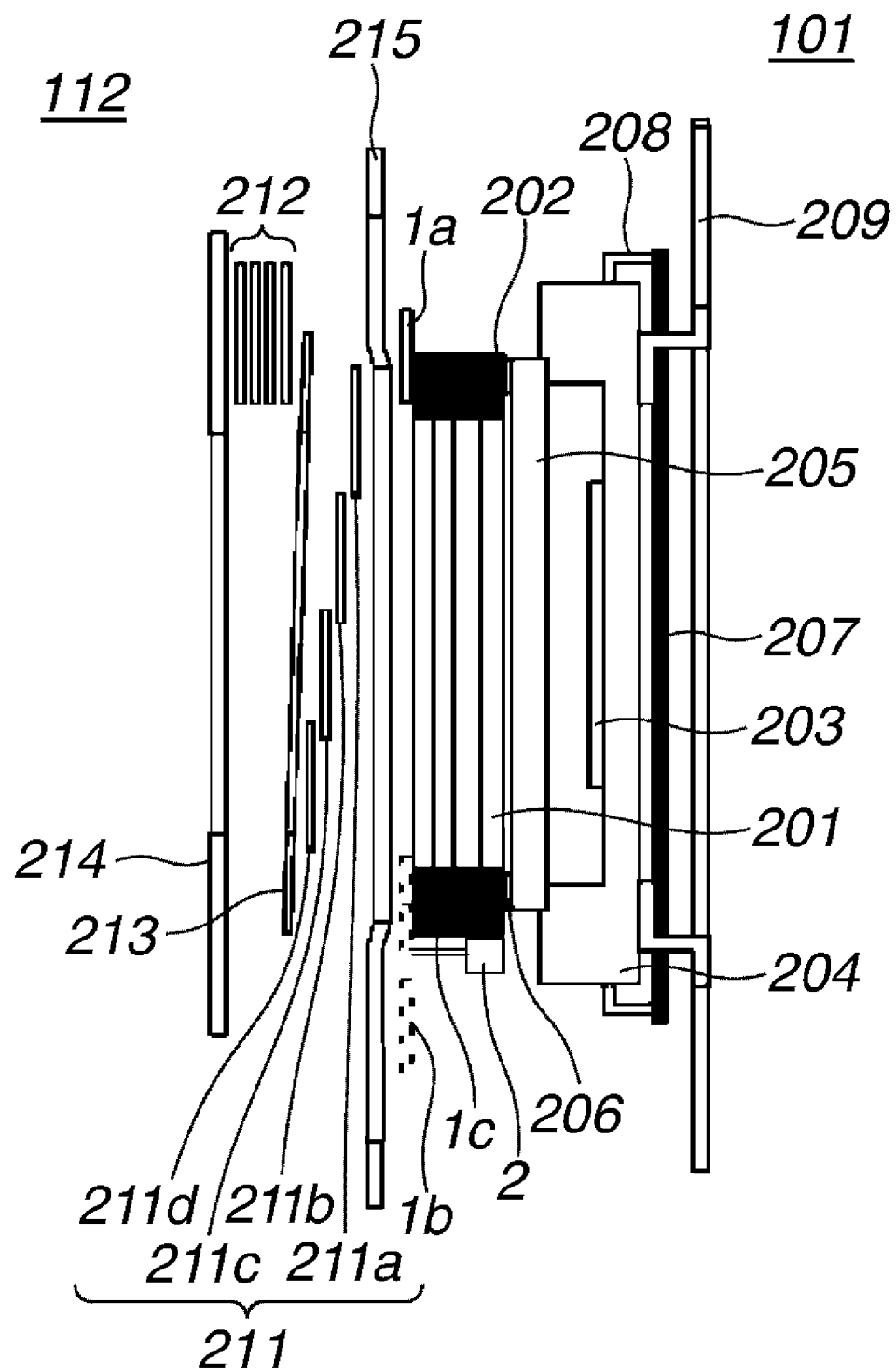
FIG. 2 illustrates a side cross section of an imaging unit, a focal plane shutter, the foreign substance removal mechanism, and the cleaning mechanism according to the first exemplary embodiment of the present invention.

FIG. 2 illustrates a side cross section of the imaging unit 101, the focal plane shutter 112, the foreign substance removal mechanism 1, and the cleaning mechanism 2. The imaging unit 101 mainly includes the following members. An optical low-pass filter 201 is supported by a supporting member 202. A solid-state image sensor 203 is housed in a packaging member 204 and is protected by a cover member 205. The optical low-pass filter 201 and the cover member 205 are fixed to each other with a sealing member 206 that hermetically seals a space between the optical low-pass filter 201 and the cover member 205. A connection terminal 208 of the solid-state image sensor 203 is connected to a circuit board 207. An electric element (not shown) that constitutes a control circuit to control an operation of the imaging apparatus is mounted on the circuit board 207. A supporting board 209 is adapted to fix the solid-state image sensor 203.

The focal plane shutter 112 mainly includes the following members. A leading screen 211 includes a plurality of shutter blades 211a, 211b, 211c, and 211d. A trailing screen 212 includes a plurality of shutter blades. An intermediate plate 213 is adapted to separate spaces for driving operations of the leading screen 211 and the trailing screen 212. A retaining plate 214 is adapted to retain the trailing screen 212 and has an aperture provided in a substantially center portion thereof for allowing a light flux to pass therethrough. A cover plate 215 is adapted to retain the leading screen 211 and has an aperture provided in a substantially center portion thereof for allowing a light flux to pass therethrough.

The foreign substance removal mechanism 1 is located at a position lain an initial state, and can move up to a position 1b. The cleaning mechanism 2 is disposed below the optical low-pass filter 201, as illustrated in FIG. 2.

Figure 3:
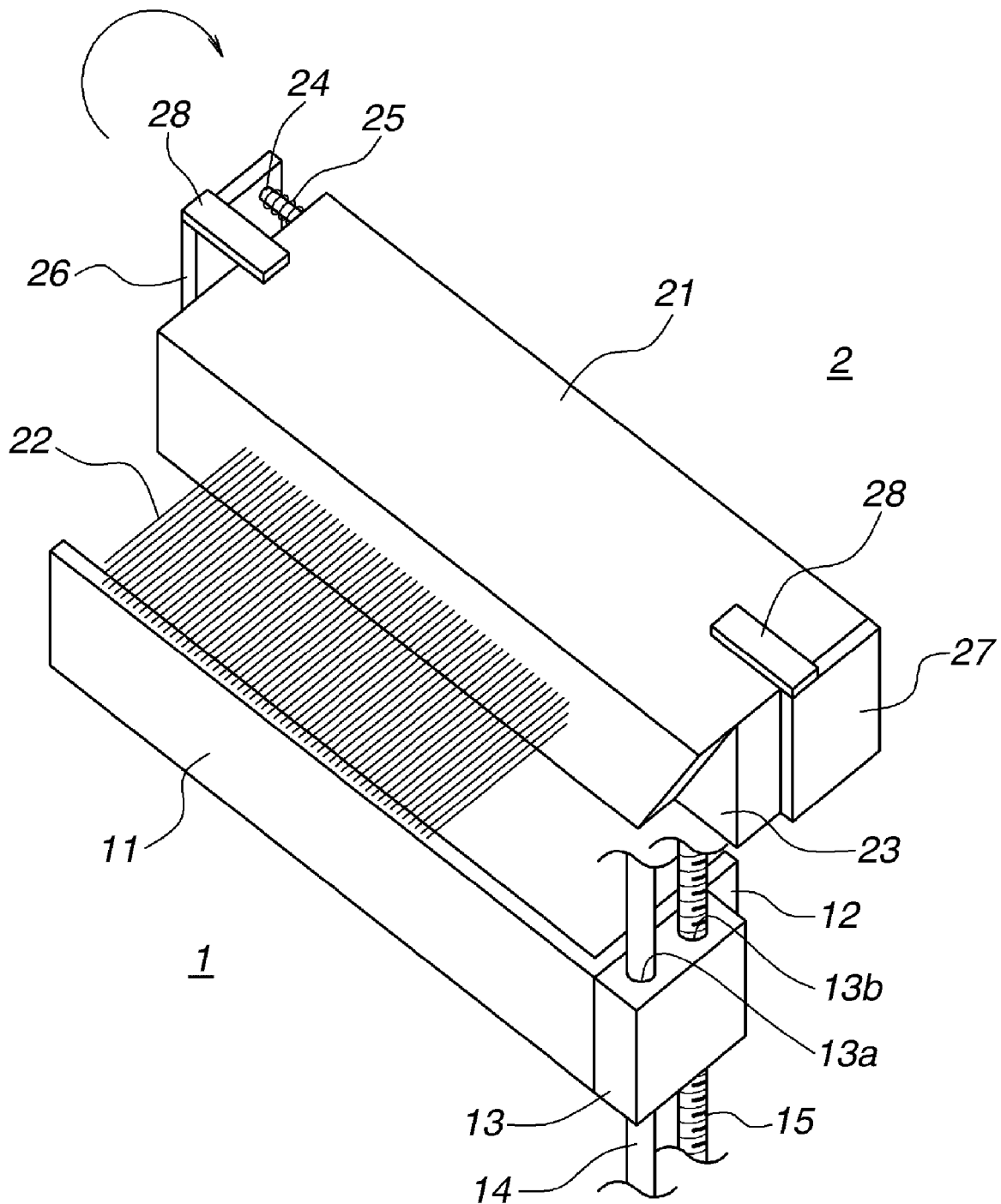
FIG. 3 is a perspective view illustrating the foreign substance removal mechanism and the cleaning mechanism as viewed from the position of an interchangeable lens according to the first exemplary embodiment of the present invention.

FIG. 3 is a perspective view illustrating the foreign substance removal mechanism 1 and the cleaning mechanism 2 as viewed from obliquely above from the side of the interchangeable lens 102. The vertical direction in FIG. 3 is the same as the vertical direction in FIG. 1. The foreign substance removal mechanism 1 mainly includes a base body 11, a protruding portion 12 that protrudes from the base body 11 toward the cleaning mechanism 2, and a linking portion 13. The base body 11 has fibers mounted on its side opposing the cleaning mechanism 2.

The linking portion 13 includes a hole 13a, into which a guiding shaft 14 fits, and a threaded hole 13b, which is threaded for a lead screw 15 disposed in parallel with the guiding shaft 14. The guiding shaft 14 is disposed perpendicular to an optical axis 500 leading from the interchangeable lens 102 to the imaging unit 101. When the lead screw 15 is rotated by a driving motor (not shown), the foreign substance removal mechanism 1 moves in the same direction as the axial direction of the guiding shaft 14 according to the number of rotations of the lead screw 15, because the rotation of the foreign substance removal mechanism 1 is restricted by the guiding shaft 14.

The cleaning mechanism 2 includes a base body 21, fibers (wiping portion) 22, which are fixed to the base body 21, a guiding portion 23, which is to be described below, a guiding shaft 24, a compression spring 25, which is wound around the guiding shaft 24 and operates in a direction to separate a wall portion 26 and the base body 21 from each other, wall portions 26 and 27, and a retaining plate 28. The guiding shaft 24 is fixed to the wall portions 26 and 27 and is disposed perpendicular to the optical axis 500 leading from the interchangeable lens 102 to the imaging unit 101 and perpendicular to the guiding shaft 14. The base body 21 has the guiding shaft 24 fitted therein and is thus movable along the guiding shaft 24. The base body 21 is urged in a direction away from the wall portion 26 by the compression spring 25. Accordingly, the base body 21 abuts on the wall portion 27 if no external force is applied to the base body 21.

Moreover, the base body 21 is rotatable around the guiding shaft 24. The base body 21 is further urged by a spring (not shown) in a direction indicated by an arrow in FIG. 3 (clockwise around the guiding shaft 24 as viewed in a direction towards the wall portion 26). The base body 21 abuts on the retaining plate 28 if no external force is applied to the base body 21. In this state only, a distance between the surface of the base body 21 on which the fibers 22 are mounted and the fibers mounted on the base body 11 is shorter than the length of the fibers 22.

Figure 4:
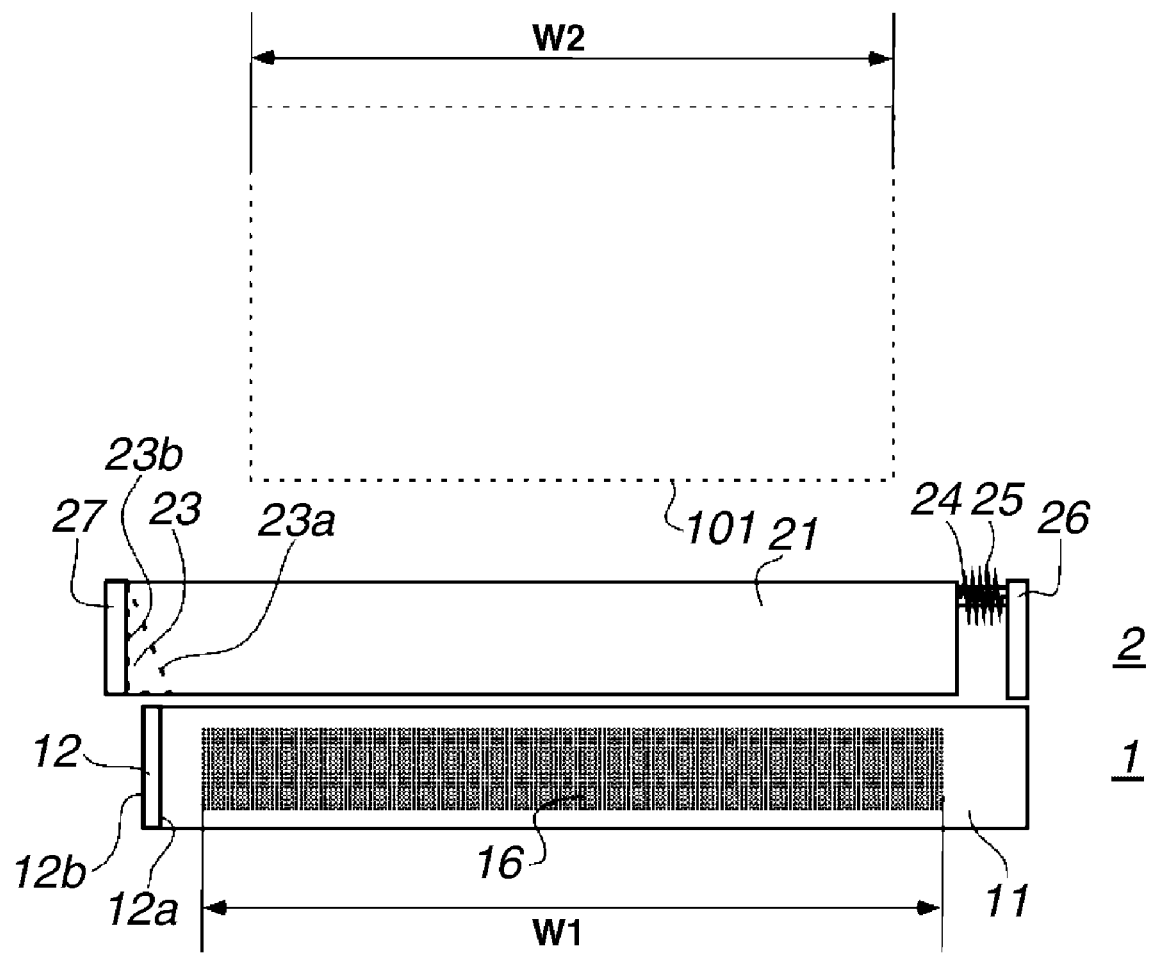
FIG. 4 is a rear view of the foreign substance removal mechanism and the cleaning mechanism as viewed from the position of the imaging unit according to the first exemplary embodiment of the present invention.
Figure 5:
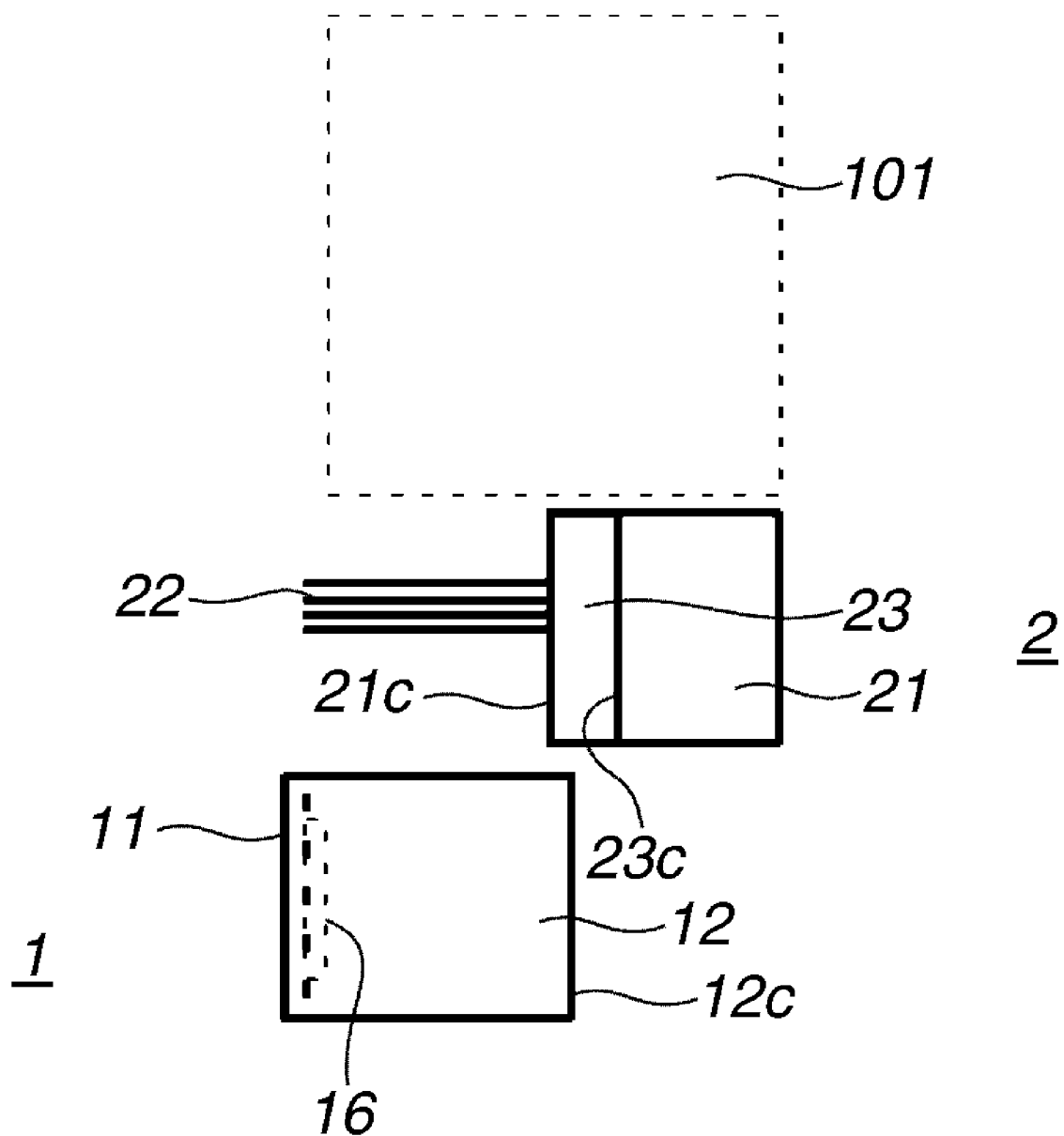
FIG. 5 is a side view of the foreign substance removal mechanism and the cleaning mechanism according to the first exemplary embodiment of the present invention.

The guiding portion 23 is described now with reference to FIG. 4 and FIG. 5. FIG. 4 is a rear view of the foreign substance removal mechanism 1 and the cleaning mechanism 2 as viewed from the position of the imaging unit 101. FIG. 5 is a side view of the foreign substance removal mechanism 1 and the cleaning mechanism 2. The base body 11 has a fiber group (capturing portion) 16 mounted thereon. The width W1 of the fiber group 16 (in the direction perpendicular to the drawing surface of FIG. 5) is wider than the width W2 of a surface to be cleaned of the imaging unit 101 (in the direction perpendicular to the drawing surface of FIG. 5). The protruding portion 12 has a right-hand side surface 12a and a left-hand side surface 12b as illustrated in FIG. 4.

The protruding portion 23 has a right-hand side surface 23a and a left-hand side surface 23b as illustrated in FIG. 4. The protruding portion 12 further has a right-hand side surface 12c as illustrated in FIG. 5. The base body 21 further has a left-hand side surface 21c as illustrated in FIG. 5. The guiding portion 23 further has a left-hand side surface 23c as illustrated in FIG. 5. As illustrated in FIG. 4, a lower end of the surface 23a of the guiding portion 23 is to the right of the surface 12a of the protruding portion 12. The surface 23b is to the left of the surface 12b. As illustrated in FIG. 5, the surface 23c of the guiding portion 23 is to the right of the surface 12c of the protruding portion 12. The surface 21c is to the left of the surface 12c.

Figure 6A:
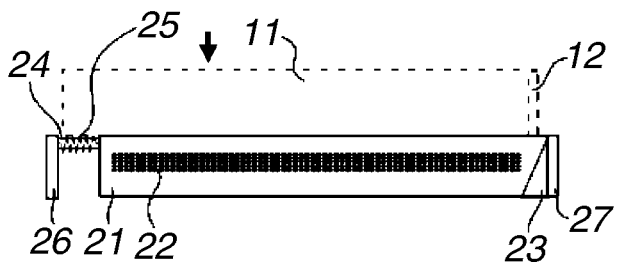
FIGS. 6Aa through 6Db are front views and side views of the foreign substance removal mechanism and the cleaning mechanism, which illustrate an operation of the imaging apparatus according to the first exemplary embodiment of the present invention.
Figure 6A:
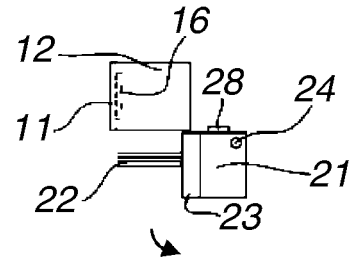
Figure 7A:
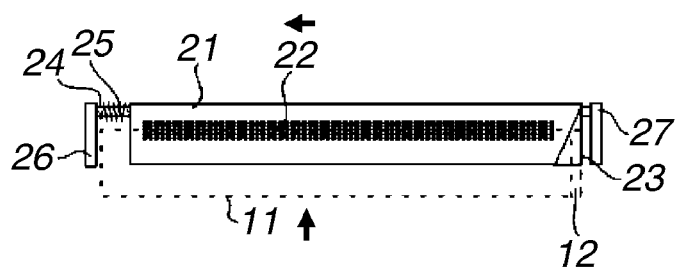
FIGS. 7Aa through 7Cb are front views and side views of the foreign substance removal mechanism and the cleaning mechanism, which illustrate an operation of the imaging apparatus according to the first exemplary embodiment of the present invention.
Figure 7A:
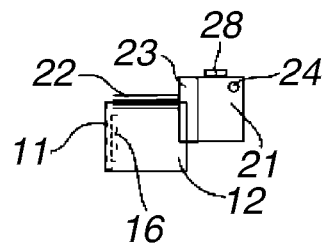

An operation of each of the foreign substance removal mechanism 1 and the cleaning mechanism 2 is described now with reference to FIGS. 6Aa through 6Db and FIGS. 7Aa through 7Cb. In FIGS. 6Aa through 6Db and FIGS. 7Aa through 7Cb, a state of each of the foreign substance removal mechanism 1 and the cleaning mechanism 2 is illustrated as viewed from the position of the imaging unit 101 and as viewed from the right thereof. FIGS. 6Aa through 6Db and FIGS. 7Aa through 7Cb illustrate a flow of a series of operations in the present exemplary embodiment. In FIGS. 6Aa through 6Db and FIGS. 7Aa through 7Cb, traveling of the foreign substance removal mechanism 1 downward is referred to as "downward travel", and traveling of the foreign substance removal mechanism 1 upward is referred to as "upward travel". Each of arrows indicates a direction of movement in each state.

First, when a user sets the imaging apparatus 100 to a cleaning mode and presses a foreign substance removing operation button (not shown), the foreign substance removal mechanism 1, which initially has been located at the position 1a in FIG. 2, travels downward (forward travel) while the fiber group 16 keeps contacting the imaging unit 101. At this time, the fiber group 16 of the foreign substance removal mechanism 1 captures foreign substance adhering to the imaging unit 101. When the foreign substance removal mechanism 1 has traveled downward to below the imaging unit 101, removal of the foreign substance adhering to the imaging unit 101 ends (at the position 1c in FIG. 2).

Figure 6B:
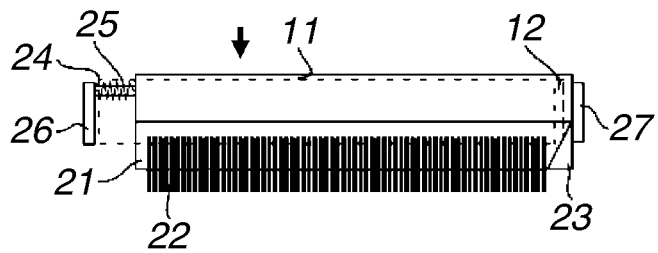
Figure 6B:
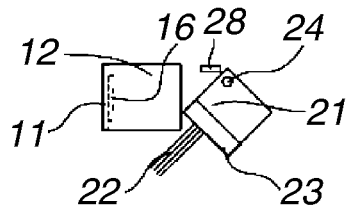
Figure 6C:
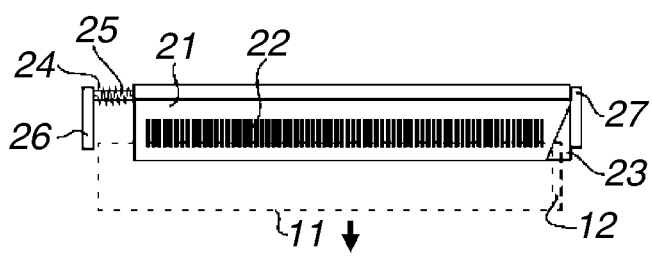
Figure 6C:
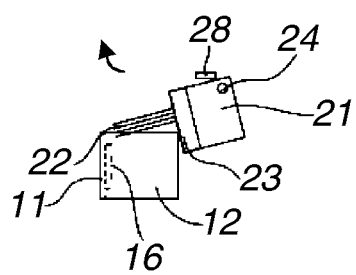

When the foreign substance removal mechanism 1 further travels downward, the protruding portion 12 abuts onto the base body 21 of the cleaning mechanism 2 at a timing illustrated in FIGS. 6Aa and 6Ab. When the foreign substance removal mechanism 1 continues traveling downward, the protruding portion 12 presses the base body 21 downward as illustrated in FIGS. 6Ba and 6Bb. Accordingly, the cleaning mechanism 2 rotates counterclockwise around the guiding shaft 24 against an elastic force of the urging spring, as illustrated in FIG. 6Bb. Then, even when the foreign substance removal mechanism 1 continues traveling downward, because a leading edge portion of the fibers 22 is located to the right of the fiber group 16 as illustrated in FIG. 6Bb, the fibers 22 do not contact the fiber group 16. Since, as described with reference to FIG. 3, the cleaning mechanism 2 is urged by a spring (not shown) clockwise as viewed in FIG. 6Bb, the protruding portion 12 keeps contacting the base body 21 during the downward travel of the foreign substance removal mechanism 1. Then, when the foreign substance removal mechanism 1 further travels downward, the protruding portion 12 separates from the base body 21 at a timing illustrated in FIGS. 6Ca and 6Cb.

At this time, the cleaning mechanism 2, which is urged by the spring (not shown), starts returning to the position illustrated in FIGS. 6Aa and 6Ab. In this state, the fiber group 16 is located at a position lower than a position of the fibers 22 as viewed in FIGS. 6Ca and 6Cb. Accordingly, the fiber group 16 does not contact the fibers 22. Then, at a timing illustrated in FIGS. 6Da and 6Db, the foreign substance removal mechanism 1 completes traveling downward to below the lower edge portion of the cleaning mechanism 2. Then, the foreign substance removal mechanism 1 switches to the upward travel (at the position 1b in FIG. 2).

Figure 6D:
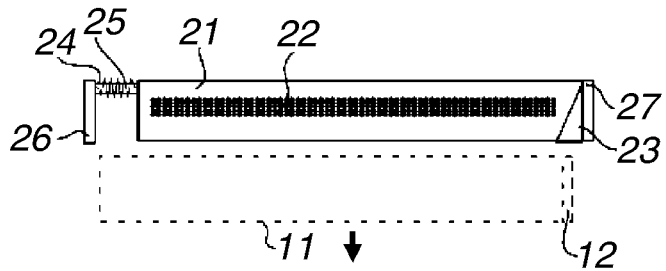
Figure 6D:
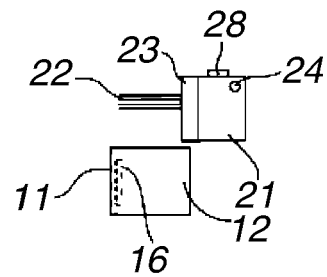
Figure 7B:
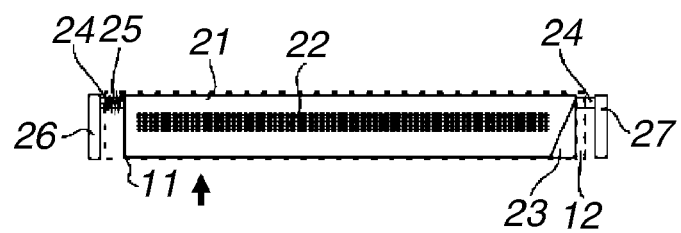
Figure 7B:
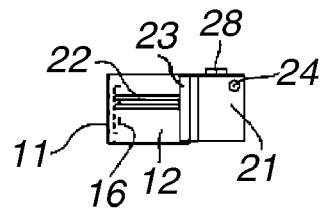

When the foreign substance removal mechanism 1 starts the upward travel and contacts the cleaning mechanism 2, a lower-left edge portion of the guiding portion 23 as viewed in FIG. 6Da is located more to the left than a left edge portion of the protruding portion 12. Thus, the protruding portion 12 is guided inside the guiding portion 23. When the foreign substance removal mechanism 1 continues traveling upward, as illustrated in FIGS. 7Aa and 7Ab, the protruding portion 12 moves upward while contacting the left-hand side surface of the guiding portion 23 as viewed in FIG. 7Aa. At this time, the base body 21 is pushed by the protruding portion 12 to the left as viewed in FIG. 7Aa. Thus, the base body 21 moves to the left as viewed in FIG. 7Aa along the guiding shaft 24 against the elastic force of the compression spring 25. When the foreign substance removal mechanism 1 is traveling upward, as illustrated in FIGS. 7Ba and 7Bb, the cleaning mechanism 2 abuts on the retaining plate 28 and is thus prevented from rotating clockwise as viewed in FIG. 7Bb. Accordingly, the foreign substance removal mechanism 1 travels upward with the fibers 22 being in contact with the fiber group 16. Thus, the fibers 22 can wipe off foreign substances adhering to the fiber group 16. As described above, the cleaning mechanism 2 is automatically returned to its initial position so that the fibers 22 and the fiber group 16 contact each other at the position 1b, which is close to a starting position of a backward travel of the foreign substance removal mechanism 1.

Figure 7C:
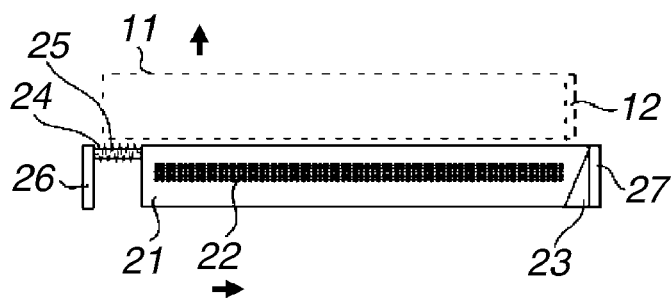
Figure 7C:
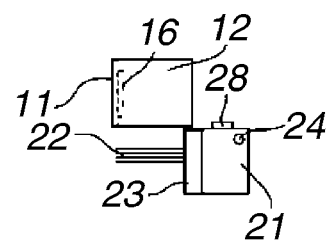

The fibers 22 wipe the fiber group 16 in a downward direction. Accordingly, foreign substances that have been wiped off from the fiber group 16 does not move toward the imaging unit 101, which is positioned above the cleaning mechanism 2. Thus, the removed foreign matter cannot adhere to the imaging unit 101 again. When the foreign substance removal mechanism 1 travels upward to a position above an upper edge portion of the cleaning mechanism 2 as illustrated in FIGS. 7Ca and 7Cb, the base body 21 is pushed back by the compression spring 25 to the right side as viewed in FIG. 6Aa. Thus, the cleaning mechanism 2 is returned to the position illustrated in FIGS. 6Aa and 6Ab. Subsequently, the foreign substance removal mechanism 1 continues traveling upward up to its initial position (the position 1a in FIG. 2). At this time, since the fiber group 16 has no foreign substance attached thereto, the fiber group 16 neither allows foreign substances to adhere to the imaging unit 101 again nor damages the imaging unit 101. The flow of a series of operations of the foreign substance removal mechanism 1 and the cleaning mechanism 2 is completed as described above.

With the above-described configuration, foreign substances adhering to a surface to be cleaned of the imaging unit 101 can be readily and properly removed without damaging a camera. The removal operation can be performed without damaging the surface to be cleaned of the imaging unit 101, and the removed foreign substance cannot adhere to the imaging unit 101 again.

In the present exemplary embodiment, the foreign substance removal mechanism 1 includes the protruding portion 12, and the cleaning mechanism 2 includes the guiding portion 23. However, the foreign substance removal mechanism 1 can include a guiding portion, and the cleaning mechanism 2 can include a protruding portion. Furthermore, in the present exemplary embodiment, the cleaning mechanism 2 moves along the guiding shaft 24 while contacting the foreign substance removal mechanism 1. However, the configuration can be arranged such that the foreign substance removal mechanism 1 includes a guiding shaft to allow the cleaning mechanism 2 to move. Moreover, instead of the compression spring 25, an elastic member made of a rubber material, for example, can be used.

Second Exemplary Embodiment

Figure 8:
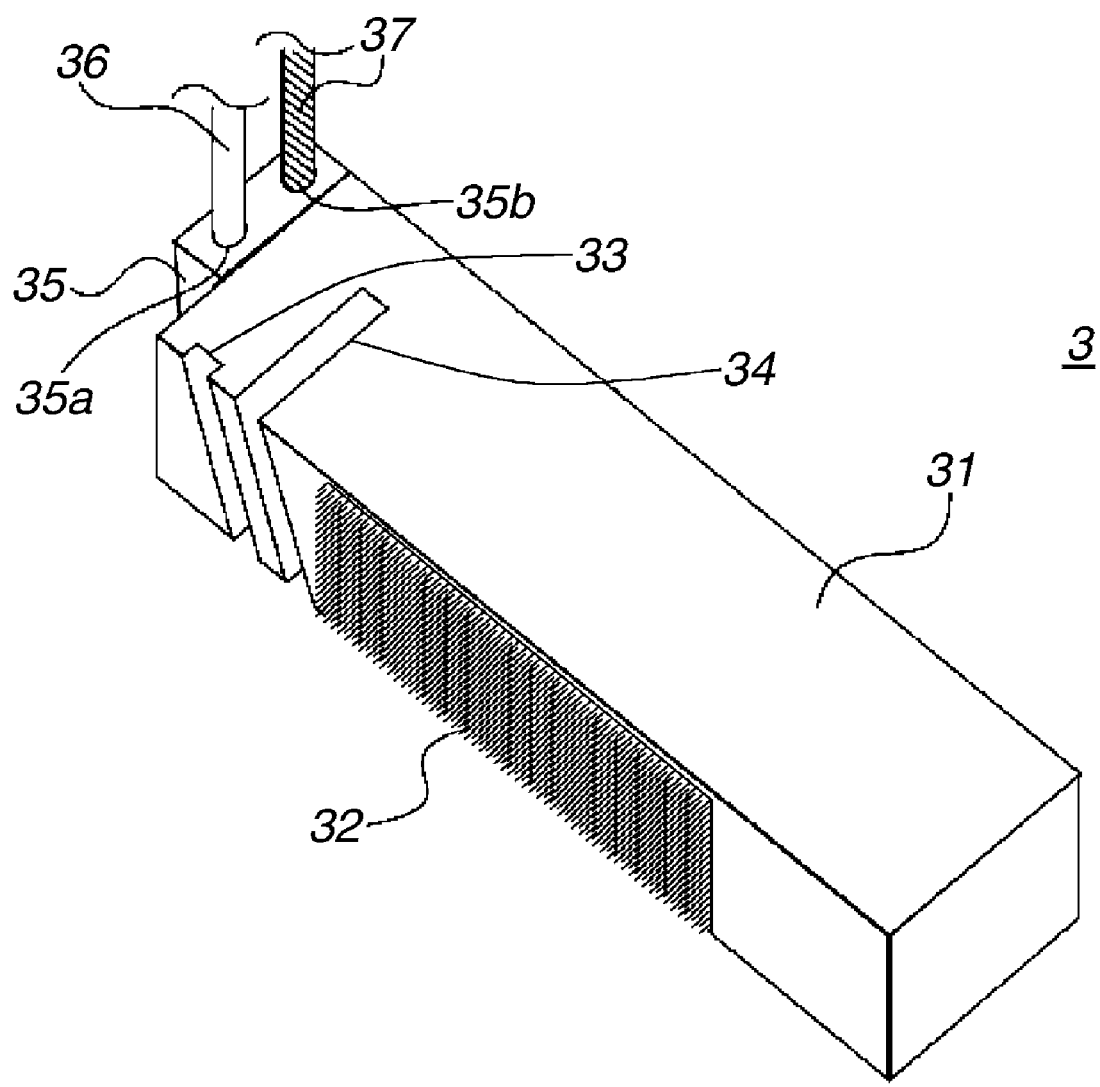
FIG. 8 is a perspective view of a foreign substance removal mechanism in an imaging apparatus as viewed from the position of an interchangeable lens according to a second exemplary embodiment of the present invention.

A second exemplary embodiment of the present invention is described below. FIG. 8 is a perspective view of a foreign substance removal mechanism 3 according to the second exemplary embodiment as viewed from obliquely above from the side of the imaging unit 101. The vertical direction in FIG. 8 is the same as the vertical direction in FIG. 1. Referring to FIG. 8, the foreign substance removal mechanism 3 includes a base body 31 and a fiber group 32. The fiber group 32 is mounted on the base body 31. Further, grooves 33 and 34 are provided in a surface of the base body 31 on which the fiber group 32 is mounted. A linking portion 35 includes a hole 35a, into which a guiding shaft 36 fits, and a threaded hole 35b, which is threaded for a lead screw 37 disposed in parallel with the guiding shaft 36. A method for moving the foreign substance removal mechanism 3 is similar to that of the foreign substance removal mechanism 1 described in the first exemplary embodiment. Accordingly, a description thereof is not repeated here. A basic positional relationship between the foreign substance removal mechanism 3 and a cleaning mechanism 4 (see FIG. 10) is similar to the positional relationship between the foreign substance removal mechanism 1 and the cleaning mechanism 2 in the first exemplary embodiment. Accordingly, a description of the second exemplary embodiment is made with reference to FIG. 2 as necessary.

Figure 9A:
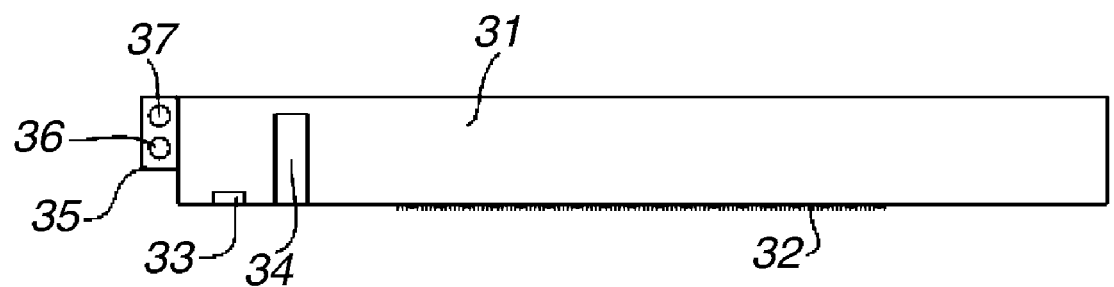
FIGS. 9A through 9C are a top view, a front view, and a bottom view, respectively, of the foreign substance removal mechanism in the imaging apparatus according to the second exemplary embodiment of the present invention.
Figure 9B:
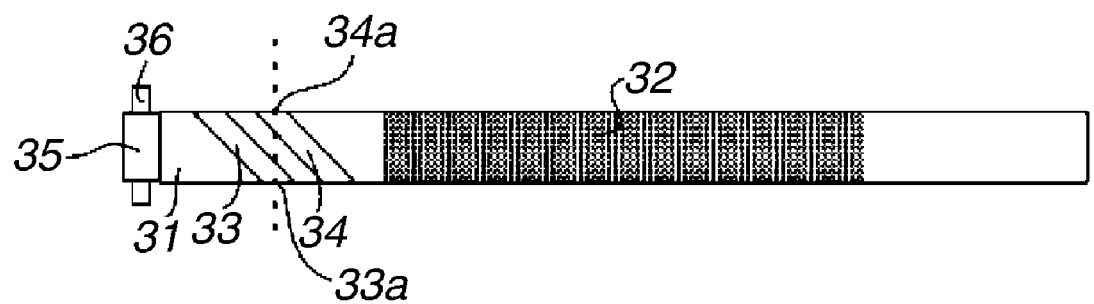
Figure 9C:
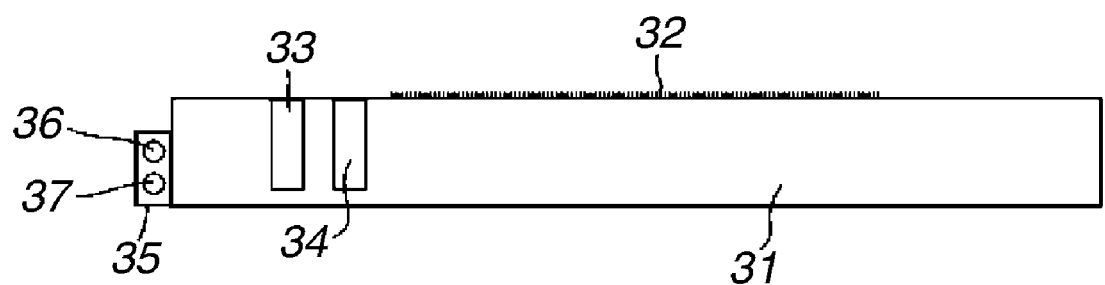

The grooves 33 and 34 are described below with reference to FIGS. 9A through 9C. FIG. 9A illustrates the foreign substance removal mechanism 3 as viewed from above in the state illustrated in FIG. 8. FIG. 9B illustrates the foreign substance removal mechanism 3 as viewed from the side of the imaging unit 101 (not shown). FIG. 9C illustrates the foreign substance removal mechanism 3 as viewed from below in the state illustrated in FIG. 8. As illustrated in FIG. 9A and FIG. 9C, the groove 33 becomes shallower as the groove 33 advances upward as viewed in FIG. 8. On the other hand, the depth of the groove 34 is constant all along. Furthermore, as illustrated in FIG. 9B, the groove 33 and the groove 34 are disposed in parallel with each other. A midpoint 33a of a lower edge portion of the groove 33 and a midpoint 34a of an upper edge portion of the groove 34 as viewed in FIG. 9B lie on a straight line parallel to the guiding shaft 36 (a dotted line in FIG. 9B).

Figure 10:
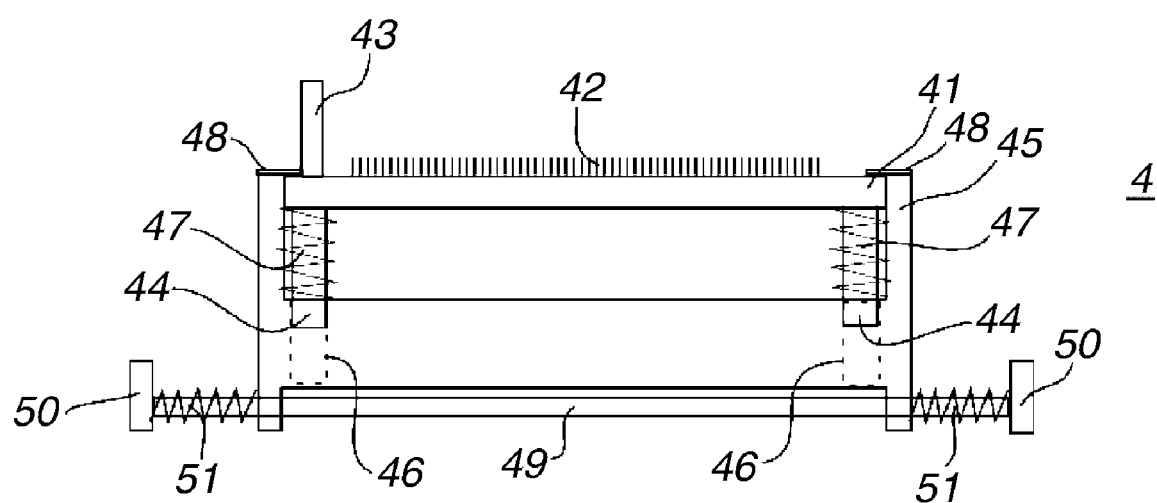
FIG. 10 is a bottom view of the cleaning mechanism in the imaging apparatus according to the second exemplary embodiment of the present invention.

FIG. 10 illustrates an exemplary configuration of the cleaning mechanism 4 as viewed from below in the state illustrated in FIG. 1. The cleaning mechanism 4 includes a base body 41, fibers 42 mounted on the base body 41, a protruding portion 43 protruding from the base body 41 toward the fiber group 32 and extending perpendicular to a surface of the base body 31 on which the fiber group 32 is mounted and perpendicular to the guiding shaft 36, and a guiding shaft 44 protruding from the base body 41 in a direction opposite to the protruding portion 43. Furthermore, the cleaning mechanism 4 includes a base 45 and a compression spring 47. The base 45 is provided with a hole 46, in which the guiding shaft 44 fits. The compression spring 47 operates in a direction to separate the base body 41 and the base 45 from each other.

In addition, the cleaning mechanism 4 includes a plate member 48. The plate member 48 presses the base body 41, which is urged by the compression spring 47 in an upward direction as viewed in FIG. 10. Thus, the base body 41 can move from a position at which the base body 41 contacts the plate member 48 to a position corresponding to a pressure limit of the compression spring 47 in a vertical direction in FIG. 10. A guide bar 49 is fixed between wall portions 50 and is disposed perpendicular to the guiding shaft 36 of the foreign substance removal mechanism 3 and parallel to a surface to be cleaned of the imaging unit 101. The base 45 has a hole in which the guide bar 49 fits. Thus, the base 45 can move right and left as viewed in FIG. 10 along the guide bar 49. A compression spring 51 is mounted around the guide bar 49 between the base 45 and the wall portion 50.

Figure 11A:
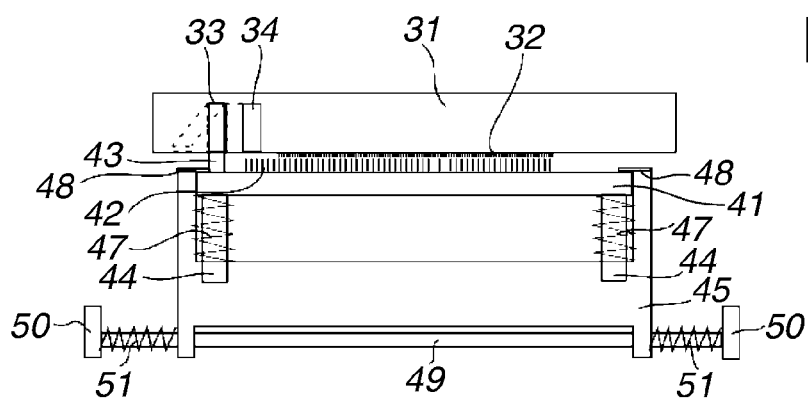
FIGS. 11Aa through 11Cb are bottom views and side views of the foreign substance removal mechanism and the cleaning mechanism, which illustrate an operation of the imaging apparatus according to the second exemplary embodiment of the present invention.
Figure 11A:
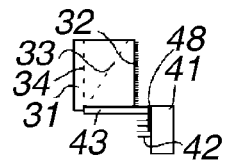
Figure 12A:
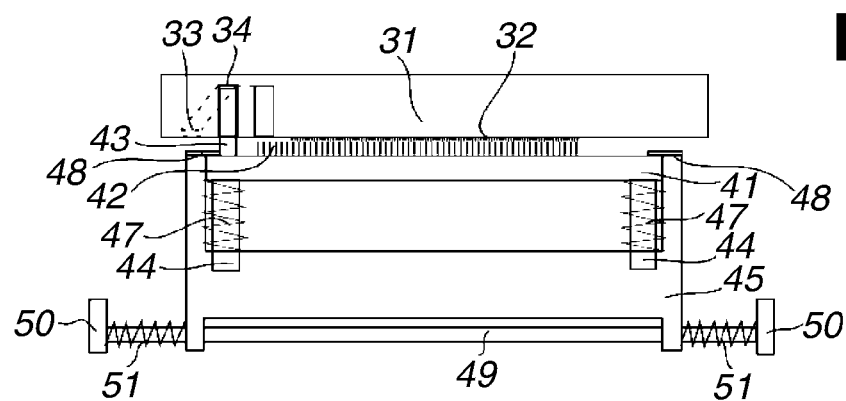
FIGS. 12Aa through 12Bb are bottom views and side views of the foreign substance removal mechanism and the cleaning mechanism, which illustrate an operation of the imaging apparatus according to the second exemplary embodiment of the present invention.
Figure 12A:
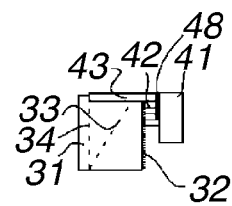

An operation of the foreign substance removal mechanism 3 and the cleaning mechanism 4 is described below with reference to FIGS. 11Aa through 11Cb and FIGS. 12Aa through 12Bb. FIGS. 11Aa through 11Ca and FIGS. 12Aa through 12Ba illustrate bottom views of the foreign substance removal mechanism 3 and the cleaning mechanism 4 as viewed from the same direction as in FIG. 10, and FIGS. 11Ab through 11Cb and FIGS. 12Ab through 12Bb illustrate side views of the foreign substance removal mechanism 3 and the cleaning mechanism 4. Here, traveling of the foreign substance removal mechanism 3 downward is referred to as "downward travel", and traveling of the foreign substance removal mechanism 1 upward is referred to as "upward travel".

First, when a user sets the imaging apparatus 100 to a cleaning mode and presses a foreign substance removing operation button (not shown), the foreign substance removal mechanism 3, which initially has been located at the position 1a in FIG. 2, travels downward (forward travel) while the fiber group 32 keeps contacting the imaging unit 101. At this time, the fiber group 32 of the foreign substance removal mechanism 3 captures foreign substances adhering to the imaging unit 101. When the foreign substance removal mechanism 3 has traveled downward to below the imaging unit 101, removal of the foreign substance adhering to the imaging unit 101 ends (at the position 1c in FIG. 2).

Figure 11B:
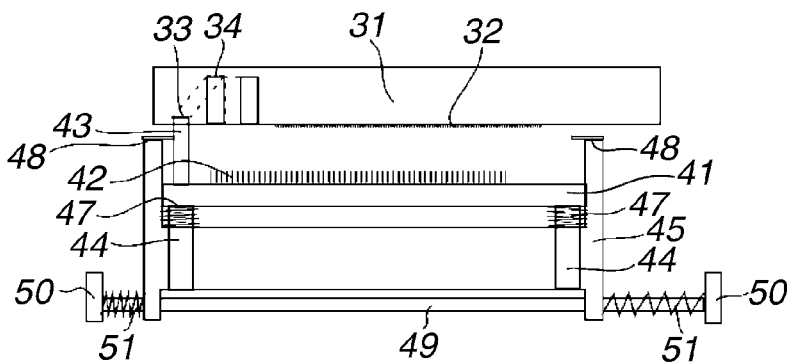
Figure 11B:
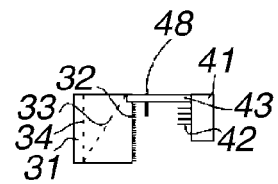

Then, at a timing illustrated in FIG. 11A, the protruding portion 43 of the cleaning mechanism 4 enters the groove 33. When the foreign substance removal mechanism 3 continues traveling downward, the protruding portion 43 moves along the groove 33. As illustrated in FIGS. 11Ab through 11Cb, the groove 33 becomes shallower as the groove 33 advances upward as viewed in FIGS. 11Ab through 11Cb. Accordingly, while the foreign substance removal mechanism 3 travels downward, the base body 41 moves away from the foreign substance removal mechanism 3. Thus, when the foreign substance removal mechanism 3 travels downward, a leading edge portion of the fibers 42 does not contact the fiber group 32. At a timing illustrated in FIGS. 11Ba and 11Bb, the foreign substance removal mechanism 3 reaches a lower edge portion of the cleaning mechanism 4 (a position between the position 1b and the position 1c in FIG. 2). At a timing illustrated in FIG. 11C, the foreign substance removal mechanism 3 completes traveling to below the lower edge portion of the cleaning mechanism 4. Then, the foreign substance removal mechanism 3 switches to the upward travel (the position 1b in FIG. 2).

Figure 11C:
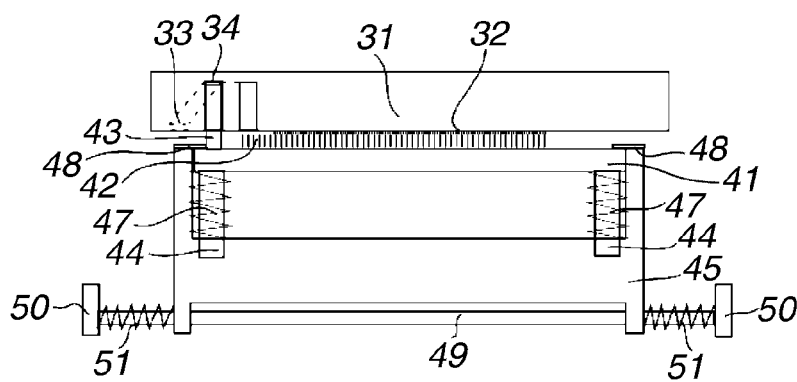
Figure 11C:
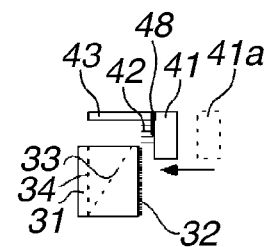

As illustrated in FIGS. 11Ca and 11Cb, the base body 41 of the cleaning mechanism 4 returns from a position 41a, which is indicated with a broken line in FIG. 11Cb, to a position at which the movement of the base body 41 is restricted by the plate member 48, according to an urging force of the compression spring 47, as indicated with an arrow in FIG. 11Cb. Furthermore, as illustrated in FIG. 11Ca, the cleaning mechanism 4 returns to its initial position (the position illustrated in FIG. 12Aa) with respect to the horizontal direction as viewed in FIG. 11Ca, according to an urging force of the compression spring 51.

When the foreign substance removal mechanism 3 starts the upward travel and contacts the cleaning mechanism 4, the protruding portion 43 of the cleaning mechanism 4 enters the groove 34. When the foreign substance removal mechanism 3 continues traveling upward, the protruding portion 43 moves along the groove 34. Since the depth of the groove 34 is constant all along, the base body 41 remains located at the position at which the movement of the base body 41 is restricted by the plate member 48. Accordingly, during the upward travel of the foreign substance removal mechanism 3, the distance between the base body 41 and the foreign substance removal mechanism 3 is unvaried. Thus, the base body 41 only moves to the right as viewed in FIG. 12Aa. Accordingly, the foreign substance removal mechanism 3 continues traveling upward with the leading edge portion of the fibers 42 being in contact with the fiber group 32. Then, foreign matter adhering to the fiber group 32 is wiped off by the fibers 42.

Figure 12B:
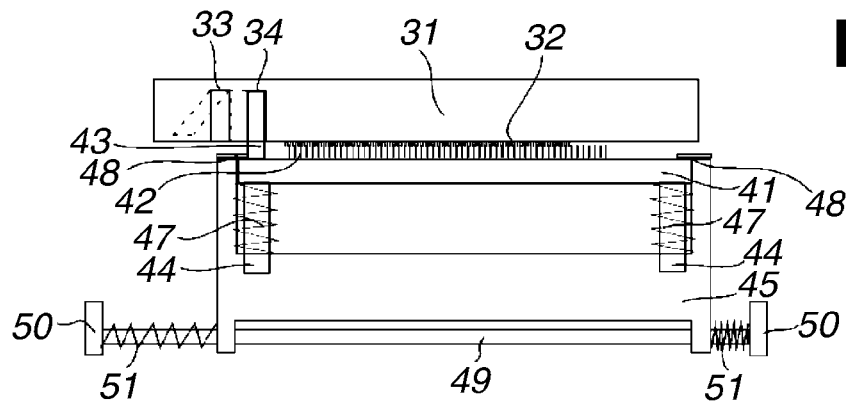
Figure 12B:
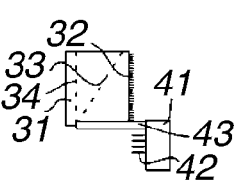

The fibers 42 wipe the fiber group 32 in a downward direction. Accordingly, foreign substances that have been wiped off from the fiber group 32 do not move toward the imaging unit 101, which is positioned above the cleaning mechanism 4. Thus, the removed foreign substance cannot adhere to the imaging unit 101 again. As illustrated in FIGS. 12Ba and 12Bb, after the foreign substance removal mechanism 3 has reached an upper edge portion of the cleaning mechanism 4 (the position 1c in FIG. 2), the foreign substance removal mechanism 3 travels upward to a position above the upper edge portion of the cleaning mechanism 4. Accordingly, the protruding portion 43 disengages from the groove 34. Then, the cleaning mechanism 4 returns to a position illustrated in FIG. 11Aa according to the urging force of the compression spring 51. Subsequently, the foreign substance removal mechanism 3 continues traveling upward to return to its initial position (the position 1a in FIG. 2). At this time, since the fiber group 32 has no foreign substance attached thereto, the fiber group 32 neither allows foreign substances to adhere to the imaging unit 101 again nor damages the imaging unit 101. The flow of a series of operations of the foreign substance removal mechanism 3 and the cleaning mechanism 4 according to the second exemplary embodiment is completed as described above.

With the above-described configuration, foreign substances adhering to a surface to be cleaned of the imaging unit 101 can be readily and properly removed without damaging a camera. The removal operation can be performed without damaging the surface to be cleaned of the imaging unit 101, and the removed foreign substance cannot adhere to the imaging unit 101 again.

In the present exemplary embodiment, the foreign substance removal mechanism 3 includes the groove 33 and the groove 34, and the cleaning mechanism 4 includes the protruding portion 43. However, the configuration can be arranged such that the foreign substance removal mechanism 3 includes a protruding portion and the cleaning mechanism 4 includes grooves. In addition, in the present exemplary embodiment, the cleaning mechanism 4 moves along the guiding shaft 49 while contacting the foreign substance removal mechanism 3. However, the configuration can be arranged such that the foreign substance removal mechanism 3 includes a guiding shaft to move the cleaning mechanism 4 along the guiding shaft. Moreover, instead of the compression spring 51, an elastic member made of a rubber material, for example, can be used.

In addition, in the present exemplary embodiment, a capturing portion, namely, the fiber group 16, travels in the vertical direction as viewed in an imaging apparatus body, and a wiping portion, namely, the fibers 22, are disposed below a surface to be cleaned of an object component. However, the configuration can be arranged such that the fiber group 16 travels in the horizontal direction as viewed in the imaging apparatus body, and the fibers 22 are disposed on the right or left side of a surface to be cleaned.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-112643 filed Apr. 14, 2006, which is hereby incorporated by reference herein in its entirety.

What is claimed is:

1. An imaging apparatus comprising:
   an image sensor configured to photoelectrically convert an object image;
   an optical member disposed in the vicinity of the image sensor and having a surface;
   a foreign substance removal mechanism including a capturing portion configured to capture foreign substances by traveling while contacting the surface of the optical member; and
   a cleaning mechanism including a wiping portion configured to wipe off the captured foreign substances from the capturing portion to clean the capturing portion.

2. The imaging apparatus according to claim 1, further comprising:
   a guiding member configured to allow the foreign substance removal mechanism to travel backward and forward along the surface of the optical member; and
   a displacement member configured to vary a relative position of the wiping portion to the capturing portion such that the wiping portion wipes off the captured foreign substances during one of a forward travel operation or a backward travel operation of the foreign substance removal mechanism, and the wiping portion does not contact the capturing portion during the other travel operation.

3. The imaging apparatus according to claim 2, further comprising a rotation shaft disposed in parallel with the surface of the optical member, wherein the wiping portion is supported by the displacement member so as to be rotatable around the rotation shaft, and
   wherein the wiping portion is configured to be rotated and displaced so as not to contact the capturing portion during one of the forward travel operation or the backward travel operation of the foreign substance removal mechanism and is configured to contact the capturing portion without being rotated and displaced during the other travel operation.

4. The imaging apparatus according to claim 3, wherein the displacement member includes a protruding portion provided on the foreign substance removal mechanism, and
   wherein the protruding portion is configured to abut on a predetermined portion of the cleaning mechanism so as to rotate and displace the wiping portion.

5. The imaging apparatus according to claim 2, further comprising a guiding shaft disposed perpendicular to the surface of the optical member, wherein the wiping portion is supported by the displacement member so as to be movable backward and forward along the guiding shaft, and
   wherein the wiping portion is configured to be displaced backward so as not to contact the capturing portion during one of the forward travel operation or the backward travel operation of the foreign substance removal mechanism and is configured to contact the capturing portion without being displaced during the other travel operation.

6. The imaging apparatus according to claim 5, wherein the cleaning mechanism includes a groove provided on the foreign substance removal mechanism and a protruding portion provided on the cleaning mechanism and being the displacement member, and
   wherein the groove and the protruding portion are configured to engage with each other so as to displace the wiping portion backward.

7. The imaging apparatus according to claim 1, wherein the foreign substance removal mechanism is configured to travel in a vertical direction of the imaging apparatus, and
   wherein the wiping portion is disposed below the optical member.

* * * * *